L. E. GAISSER.
CORN SHELLER.
APPLICATION FILED JAN. 11, 1917.

1,266,248.

Patented May 14, 1918.
2 SHEETS—SHEET 1.

Witnesses

Inventor,
L. E. Gaisser
by
Attorneys

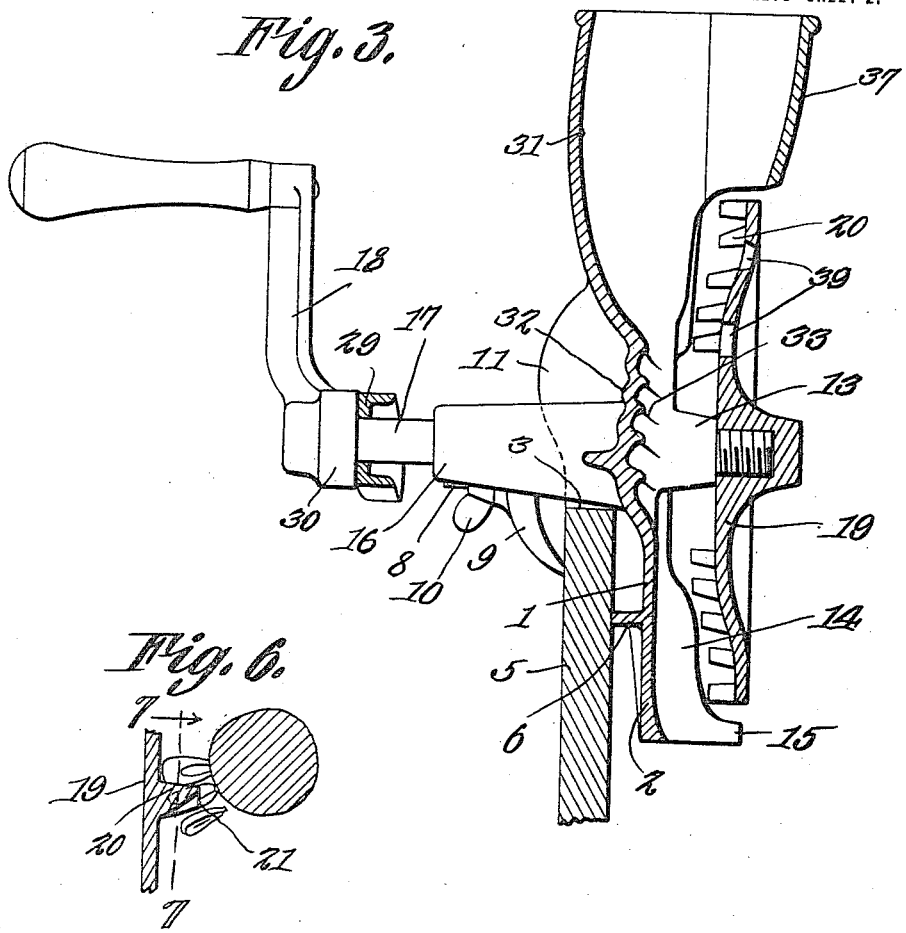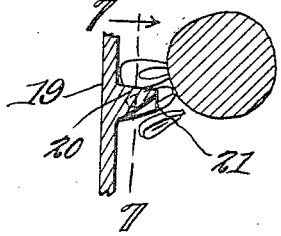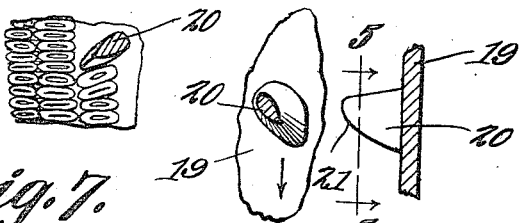

UNITED STATES PATENT OFFICE.

LOUIS E. GAISSER, OF LOUISVILLE, KENTUCKY, ASSIGNOR TO ALICE R. GAISSER, OF LOUISVILLE, KENTUCKY.

CORN-SHELLER.

1,266,248.     Specification of Letters Patent.     Patented May 14, 1918.

Application filed January 11, 1917. Serial No. 141,866.

*To all whom it may concern:*

Be it known that I, LOUIS E. GAISSER, a citizen of the United States, residing at Louisville, in the county of Jefferson and State of Kentucky, have invented a new and useful Corn-Sheller, of which the following is a specification.

This invention relates to machines for shelling corn, and is more especially designed as an improvement upon the structure shown in Patent No. 637,930, issued to me on November 28, 1899.

It has been found in practice that corn shellers, as heretofore constructed, have not been entirely efficient for the purpose of shelling seed corn because they have tended to crush the corn by forcibly pushing it off of the cob, this action carrying out a considerable amount of chaff which has necessitated cleaning the corn after the shelling operation.

One of the objects of the present invention is to provide a corn sheller which, instead of pushing straight against the grains of corn on the cob will subject the grains to a twisting action so that they will be twisted off of the cob and thus be loosened without becoming cracked and without pulling out any considerable amount of chaff, thereby eliminating the necessity of cleaning the corn subsequent to the shelling operation before the corn is ground into meal or used for other purposes.

A still further object is to provide a corn sheller having its hopper so proportioned as to prevent the corn from scattering during the shelling operation.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Fig. 3 is a section on line 3—3 Fig. 1.

Fig. 4 is an enlarged edge view of a portion of the shelling disk.

Fig. 5 is a section on line 5—5 Fig. 4.

Fig. 6 is a horizontal section through one of the teeth of the shelling disk and through a corn cob adjacent thereto.

Fig. 7 is a section on line 7—7 Fig. 6, the tooth being in section but the grains of corn being shown in elevation.

Figure 1:
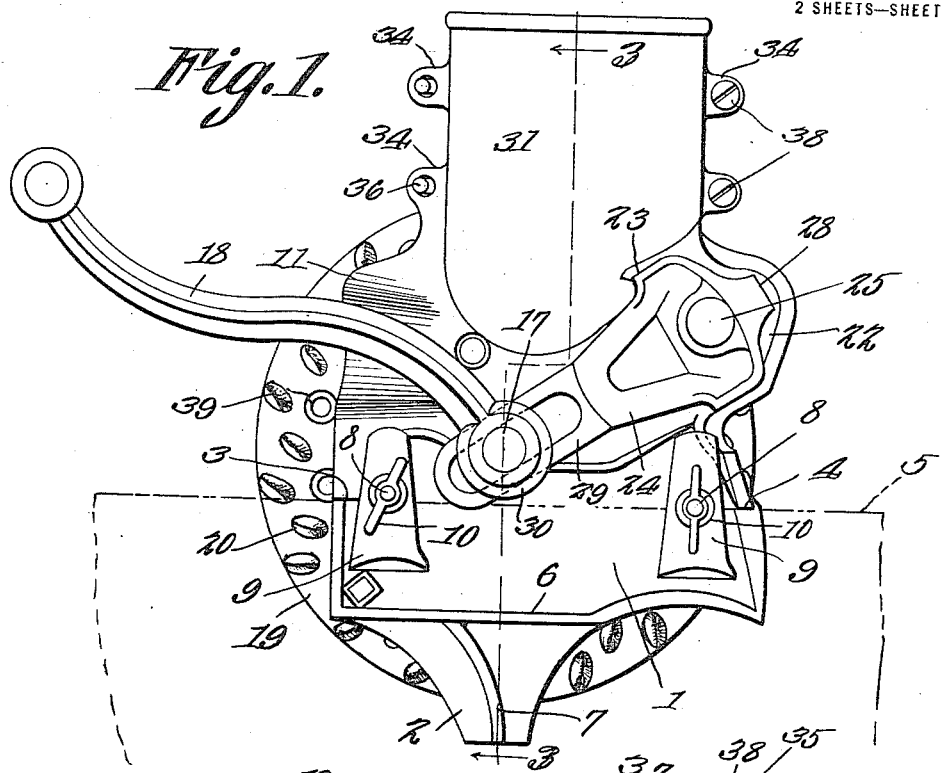
Figure 1 is a front elevation of the corn sheller.
Figure 2:
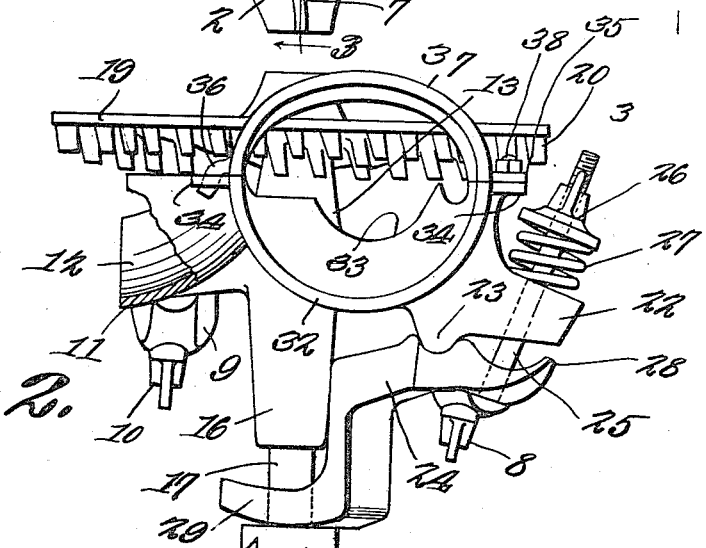
Fig. 2 is a plan view thereof.

Referring to the figures by characters of reference 1 designates the attaching plate of the device, the same being provided, at its lower edge, with a depending tongue 2 and, above said tongue with outstanding shoulders 3 and 4 adapted to rest upon the upper edge of the wall of a container indicated by dotted lines at 5. Reinforcing ribs 6 and 7 are formed upon the plate 1 and its tongue 2 for engagement with the inner surface of the wall 5. Bolts 8 are extended loosely through the plate 1 and adjacent the shoulders 3 and 4, each bolt being adapted to extend through a gripping jaw 9, the lower portion of which is shaped to bite into the outer surface of the wall 5, as indicated particularly in Fig. 3, wing nuts 10 being mounted on the bolts 8 whereby the jaws 9 will be caused to bind tightly upon the wall 5, thereby to hold the plate 1 fixedly connected to said wall and with its shoulders 3 and 4 resting on the upper edge of the wall.

The plate 1 is bulged outwardly at one side, as indicated at 11, thereby to form an outlet channel 12 for the shelled cobs this channel being extended within the inner side of the plate 1 and under a boss 13 which extends from the inner surface of the plate. A curved flange 14 is formed upon the inner side of the tongue 2 and constitutes the bottom wall of the channel 12, there being a finger 15 projecting laterally from the lower end of this flange as shown in Fig. 3.

A tubular bearing member 16 is extended outwardly from the front face of the plate 1 and in line with the boss 13 and journaled within this bearing member and within the boss is a shaft 17 to one end of which is secured a crank arm 18 or other suitable device for use in rotating the shaft. To the other end of the shaft 17 is secured a shelling disk 19 which is concavo-convex, the convex surface thereof being adjacent the plate 1 and provided with shelling teeth of novel form. These teeth are arranged in annular series, the teeth of each series being arranged opposite the spaces between the teeth of the next adjoining series. Each tooth, which has been indicated at 20, is substantially oval at its base, the long diameter of the base of the tooth being disposed at an acute angle to a radius of the disk intersecting the tooth so that the outer end of said diameter of the tooth is in advance of the inner end of said diameter. Each tooth is tapered toward its free end so that said end presents a rounded or blunt edge 21 parallel with the long diameter of the base of the tooth. Furthermore the front or advancing face of each tooth is substantially perpendicular to the plane of rotation of the disk 19, while the rear or following face of each tooth is inclined from the base toward the rounded edge 21.

Extending from the plate 1 at that side thereof remote from the bulged portion 11 is an ear 22 having a transverse rib 23 which constitutes a bearing for a lever 24. One arm of this lever is loosely engaged by a bolt 25 which extends loosely through the ear 22 and is engaged by a wing nut 26, there being a spring 27 interposed between the wing nut and the ear 22. Said arm of the lever is preferably provided with a stop finger 28 adapted to swing into engagement with the ear 22, thus to limit the swinging movement of the lever 24 on its bearing 23. The other arm of lever 24 is substantially L-shaped and has a curved slotted extension 29 through which loosely extends the shaft 17, said extension being constantly pressed against the hub 30 of the crank 18 with the result that the shelling disk is constantly drawn toward the plate 1 so that the edges of its teeth will barely escape the free edge of the flange 14. Obviously should any unyielding substance become lodged between the plate 1 and the shelling disk, said disk will be free to shift outwardly away from the plate 1 so as to permit said substance to pass out from the apparatus, this yielding action of the disk being due to the fact that the shaft 17 will slide longitudinally against the action of the lever 24 and its spring 27.

The upper portion of the plate 1 is bulged outwardly to form one half of a hopper, this outwardly bulged portion being indicated at 31. The lower part of the bulged portion is curved downwardly toward the boss 13 and merges into a downwardly extending recessed portion 32 of the plate 1 and which recessed portion is located at one side of the boss 13, said boss extending between said recessed portion 32 and the bulged portion 11. The wall of the recessed portion 32 is provided with spiral ribs 33.

Extending laterally from the sides of the hopper section 31 are ears 34 preferably arranged in pairs. To these ears are detachably connected ears 35 and tongues 36 extending from opposite sides respectively of a transversely curved hopper section 37. The tongues 36 arranged at one side of the section 37 are adapted to be inserted into the openings in one set of ears 34, after which the ears 35 are placed against the other set of ears 34 and fastened thereto by bolts 38 or the like. The tongues 36 are curved so that when the ears 35 are secured in place, these tongues 36 cannot be withdrawn from the openings in which they are located. The section 37 combined with the bulged portion 31 forms a complete hopper, said section 37 overhanging the disk 19 so that the teeth on the upper portion of the disk thus project into the hopper. It is to be understood that both sides of the hopper section 31 extend close to the paths of movement of the teeth so that a cob is thus prevented from escaping transversely from the hopper when engaged by the teeth.

In order to prevent the shelling disk from becoming clogged, apertures 39 are formed in the disk, these apertures being sufficiently large to allow the grains of corn to pass therethrough.

In using the apparatus described the same is set up on the edge of a box or other container, it being held in place by the jaws 9 as hereinbefore pointed out, the shoulders 3 and 4 resting on the upper edge of the wall of the container. After the device has thus been set up a cob is inserted end first into the hopper so that its lower end will be engaged by the uppermost teeth on the disk 19. The disk is then rotated and the teeth will force the cob downwardly into the ribbed portion 32 and as the ribs 33 are spirally arranged, the cob, as it is forced downwardly thereover, will be given a slow rotation. As a result, by the time the cob has passed entirely from the hopper, it will have rotated one or more times so that all portions of the surface thereof will have been brought into engagement with the teeth on the disk. The disk will of course shift outwardly away from the plate 1 in order to accommodate the cob between the disk and the plate. The cob is carried downwardly by the toothed disk and is guided along the curved flange 14 on tongue 2 and is finally discharged upwardly and outwardly through the channel 12, falling outside of the receptacle into which the shelled corn has been deposited.

As has heretofore been pointed out, the particular arrangement and mounting of the teeth is deemed of utmost importance. By shaping and mounting the teeth as described, each tooth will first present its outer or advancing corner to the grain of corn and cause the grain to be slightly twisted before it is thrust bodily relative to the cob. This initial twist which is produced by the tooth results in the loosening of the grain from the cob and, consequently, when the grain of corn is subsequently forcibly shifted relative to the cob it will become separated from the cob without pulling with it any objectionable amount of chaff or cob. Therefore the cob will be shelled cleanly and the grains of corn will be deposited in the container with but a very small amount of chaff, thus permitting the corn to be milled without the expense of cleaning it.

What is claimed is:—

1. In a corn sheller a revoluble disk having an annular series of teeth on one face, each tooth having a straight free edge, parallel with the plane of rotation of the disk and tangentially disposed relative to the axis of the disk.

2. In a corn sheller the combination with a hopper, of a revoluble member projecting thereinto and having an annular series of teeth, each tooth having its advancing face substantially perpendicular to its plane of rotation and having a straight free edge tangential to the axis of rotation.

3. In a corn sheller the combination with a hopper, of a revoluble disk projecting thereinto, teeth extending from one face of the disk, each tooth having a straight free edge tangentially disposed relative to the axis of rotation, the outer end of said edge being in advance of the other end thereof whereby, during the rotation of the disk, each tooth is brought between the grains of an ear of corn in the hopper and substantially parallel with the longitudinal center of the cob, said teeth being subsequently inclined gradually to twist the engaged grains off of the ear.

In testimony that I claim the foregoing as my own, I have hereto affixed my signature in the presence of two witnesses.

LOUIS E. GAISSER.

Witnesses:
FRANK E. SHIPMAN,
ED. DEVAN.

Copies of this patent may be obtained for five cents each, by addressing the "Commissioner of Patents, Washington, D. C."